United States Patent [19]

Heide

[11] Patent Number: 4,898,741
[45] Date of Patent: Feb. 6, 1990

[54] METHOD FOR THAWING OF FOOD ARTICLES

[75] Inventor: Jan B. Heide, Kristiansund, Norway

[73] Assignee: Skärhamn International AB, Göteborg, Sweden

[21] Appl. No.: 209,383

[22] Filed: Jun. 21, 1988

[30] Foreign Application Priority Data

Jun. 30, 1987 [SE] Sweden ............................. 8702696

[51] Int. Cl.$^4$ .............................................. A23B 4/06
[52] U.S. Cl. .................................... 426/231; 426/524
[58] Field of Search ................................ 426/231, 524

[56] References Cited

U.S. PATENT DOCUMENTS 3,857,988 12/1974 Jensen et al. .......................... 426/524
4,376,131 3/1983 Mori et al. ............................ 426/231

FOREIGN PATENT DOCUMENTS 2558346 7/1985 France .................................. 426/524

Primary Examiner—George Yeung
Attorney, Agent, or Firm—Wegner & Bretschneider

[57] ABSTRACT

A method and apparatus for thawing of articles of food, preferably animal articles, which have been frozen and stored at a temperature of about $-38°$ C. The articles are placed in a room with a controlled climate, wherein a humidity of about 100% is maintained by supplying of atomized water, at a maximum air speed of about 5 m/sec. The thawing process is regulated by temperature detector devices within the core of the articles and humidity detector devices within the humid climate.

4 Claims, 1 Drawing Sheet

U.S. Patent  Feb. 6, 1990  4,898,741
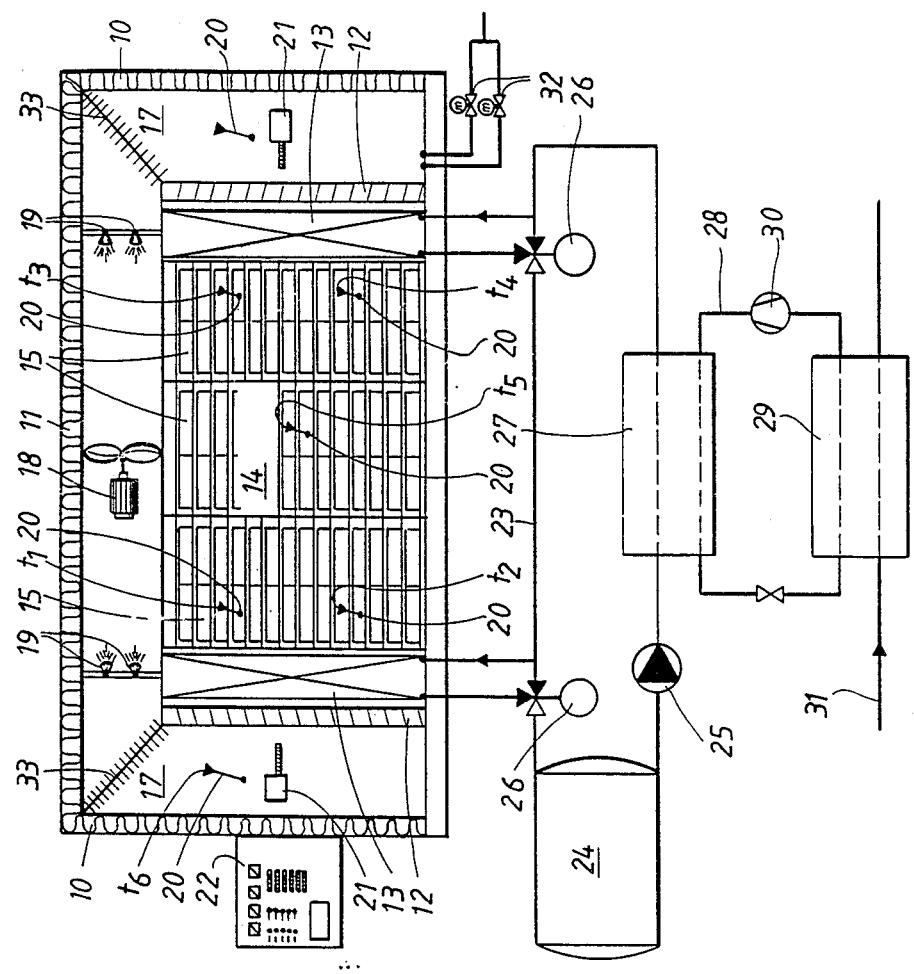

METHOD FOR THAWING OF FOOD ARTICLES

FIELD OF THE INVENTION

This invention relates to methods and means for thawing of articles of food, preferably animal articles, which have been frozen and stored at a temperature of about −38° C., and placing the articles in a room having means for maintaining a controlled humid climate and a maximum air speed of about 5 m/sec.

BACKGROUND OF THE INVENTION

Fresh food articles are normally considered to be better raw material for preparation of food, than the corresponding frozen articles. This is especially true for fish and meat. Because of this, a large share of the fish industry is aimed at handling of cold stored fresh fish which is highly valued on the market. A contributory cause to the high prize, is that the fresh fod is sensitive and that unforseen delays in a transport chain may lead to loss of freshness and reduction in quality, so that the articles may not be approved for import or sale.

A more rational and efficient handling is possible with fish that has been taken, possibly gutted and immediately freezed to a temperature of about −38° C., before entering "rigor mortis". This kind of fishing is being performed with large ships that may stay out for long util the cold-storage room has been loaded full. The forwarding of the frozen fish to retailers may be done without hast, as long as the freeze condition is maintained.

From the point of economics, the latter method has many advantages. However, problems often arise when thawing the fish, wherein the consistency and quality of the fish is lost. This has lead to a "bad reputation" for frozen fish. A lot of work has been put into improvement of thawing methods for frozen food articles, e.g. fish, but in reality, a method giving the desired results, i.e. putting freezed and thawed fish into full parity with high quality fresh fish has not yet been accomplished. For example, the recommendations for freezing/thawing of the Norwegian Board of Food stipulates that thawing of frozen fish may be performed in water or in water saturated air. If the fish is thawed in water, the water temperature should be between +14° C. and +17° C. If the fish is thawed in water saturated air, the air speed should exceed 5 m/sec. and have a temperature of between +14° C. and +17° C.

SUMMARY OF THE INVENTION

One object of the invention is to provide a thawing method that makes it possible for freezed and thawed food articles to be comparable in quality with fresh food articles of high quality.

The present invention provides for a thawing method wherein the thawing process is regulated by temperature detector means within the core of the articles and humidity detector means within the humid climate.

According to one preferable embodiment of the invention, the thawing is started at a maximum water temperature of about 14° C. and a maximum air temperature of about 12° C., the thawing is completed when core temperature of the food article is between −1° and −2° C., at maximum water temperature of about 12° C. and a maximum air temperature of about 6° C.

According to another embodiment of the invention, after the thawing, the temperature of the food articles is maintained at about +1° C. in a moist environment, until subsequent food processing.

Preferably, the articles especially comprise fish that have been frozen before entering "rigor mortis".

A device for thawing of articles of food according to the invention is characterized in at least one detector of temperature placed in the core of at least one of the food articles, the measurements from the detector being used for regulation of the air temperature in the room and the temperature of the water which is supplied to said room.

BRIEF DESCRIPTION OF THE DRAWINGS

One embodiment of the invention will now be described, with reference to the accompanying drawing which diagrammatically shows a device for performing the method according to the invention.

DESCRIPTION OF A PREFERRED EMBODIMENT

The drawing shows a thawing tunnel which is supplied with heating energy from a heating system comprising a heat pump. Naturally, the invention is not limited to such a system but the heating energy may be provided from common radiators or heat exchangers.

The tunnel is provided with insulated walls 10 and a roof 11 and inner screens 12, placed at a certain distance from the walls and in parallel with them. Radiators 13 are placed at the inside of the screens 12, so that the heating energy is concentrated towards the middle of the tunnel. In the middle of the tunnel is a rectangular room 14 in which crates containing food articles 15 have been stacked up. Above the screens 12 and the stacks of crates with food articles, e.g. fishes, is an open passage 16 interconnecting rooms 17 between the screens 12 and the sidewalls 10.

In the passage 16 is a reversibly driven fan 18 and a number of spray nozzles 19 for supply of atomized water to the passage 16.

In the rooms 17 are temperature detecting means 20 and means 21 for detecting relative air humidity. Further temperature detecting means 20 are placed in various places in the stacks of food articles 15 in the room 14, so that readings of the core temperaure of the food articles can be taken in various parts of the stacks.

All the detecting means 20, 21 are connected to a programmable computer 22 which is arranged to control the climate within the room 14 in relation to measurement data. The radiators 13 are connected to a heat media carrying circuit 23, which comprises a heat storage 24, a circulation pump 25 and valves 26 for control of radiator temperature. The circuit 23 runs via a condenser 27 belonging to a heat pump, said condenser also being connected via a second circuit 28 with an evaporator 29 and a compressor 30. In accordance with known technique the evaporator receives low energy heat from water, air, etc. via a conduit 31.

Further, there are valves 32 to control the supply of water to the spray nozzles 19. The water is fresh water which has passed through an immersion heater which is temperature controlled via the computer 22. The computer also controls the valves 26 for regulation of the temperature in the radiators 13 and the valves 32 for regulation of water flow to the nozzles 19.

There are wing elements 33 provided between the passage 16 and the rooms 17, said wings being adjustable by means of the computer 22.

A thawing process is started by loading the food articles 15 from a cold store, not shown in the drawing, into the room 14 in the thawing tunnel. The food articles now have a temperature of about −38° C. Then a program is started via the computer 22, which is specific for the type and amount of food articles which is present within the room 14.

The rate of humidity is controlled in the tunnel via the nozzles 19 and the detector means 21, so that a relative humidity of about 100% is maintained. Also the fan 18 is started, to maintain a maximum flow of air in the tunnel that does not exceed 5 m/sec., during the entire thawing process.

The thawing is started at a maximum water temperature of about 14° C. for the water supplied via the nozzles 19, and a maximum air temperature of about 12° C. in the tunnel. These temperatures are than successively reduced during the thawing process, so that the thawing is completed when the core temperature of the food article is between about −1° and −2° C., at a maximum water temperature of about 12° C. and a maximum air temperature of about 6° C.

When the thawing process is completed, the temperature in the food articles should be maintained at about +1° C. in a humid environment. If the food articles are to be transported from the place of thawing, they should preferably be lying on ice and at a temperature of about +2° C., so that the ice melts slowly.

The invention is not limited to the above described embodiment, but several modifications are possible within the scope of the accompanying claims. For example, the thawing tunnel may be designed in many different ways with reference to the size and equipment, to enable the method according to the invention to be performed.

What we claim:

1. A method for thawing of articles of food which have been frozen and stored at a temperature of about −38° C., comprising placing the articles in a room having means for maintaining a controlled humid climate and a maximum air flow of about 5 m/sec, and automatically regulating the thawing process via temperature detector means within the core of the articles and humidity detector means within the humid climate.

2. A method according to claim 1, comprising starting the thawing at a water temperature of less than about 14° C. and a air temperature of less than about 12° C., and completing the thawing when the core temperature of the food article is between about −1° and −2° C., at a water temperature of less than about 12° C. and a air temperature of less than about 6° C.

3. A method according to claim 1, comprising, after completing the step of thawing, maintaining the temperature of the food articles at about +1° C. in a moist environment until subsequent food processing.

4. A method according to claim 1, wherein the articles comprise fish that have been frozen before entering rigor mortis.

* * * * *